United States Patent
Keusch et al.

(10) Patent No.: US 6,839,409 B1
(45) Date of Patent: Jan. 4, 2005

(54) METHOD FOR HANDLING TELECOMMUNICATIONS CONNECTIONS VIA A PUBLIC EXCHANGE

(75) Inventors: Norbert Keusch, Neuried (DE); Robert Rötz, Ainring (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/508,386
(22) PCT Filed: Aug. 24, 1998
(86) PCT No.: PCT/DE98/02483
§ 371 (c)(1),
(2), (4) Date: Mar. 10, 2000
(87) PCT Pub. No.: WO99/13630
PCT Pub. Date: Mar. 18, 1999

(30) Foreign Application Priority Data

Sep. 11, 1997 (DE) ......................... 197 39 981

(51) Int. Cl.⁷ ............................................. H04M 11/00
(52) U.S. Cl. ........................ 379/38; 379/32.01; 379/35; 379/93.03
(58) Field of Search .......................... 379/88.17–88.19, 379/88.2, 88.22, 93.01–93.03, 93.24, 100.08, 211.01, 221.14, 357.03, 32.1–32.5, 35, 38, 133–134; 709/206, 225, 228

(56) References Cited

U.S. PATENT DOCUMENTS

| 4,723,272 A | * | 2/1988 | Maat | 379/211.01 |
|---|---|---|---|---|
| 5,181,238 A | * | 1/1993 | Medamana et al. | 379/93.03 |
| 5,577,111 A | * | 11/1996 | Iida et al. | 379/209.01 |
| 5,694,464 A | * | 12/1997 | Mashinsky | 379/357.03 |
| 5,818,919 A | * | 10/1998 | Berberich et al. | 379/211.02 |
| 5,964,833 A | * | 10/1999 | Kikinis | 379/211.01 |
| 6,151,628 A | * | 11/2000 | Xu et al. | 709/225 |
| 6,188,751 B1 | * | 2/2001 | Scherer | 379/88.22 |
| 6,317,793 B1 | * | 11/2001 | Toyosawa | 709/228 |

FOREIGN PATENT DOCUMENTS

| DE | 36 20 925 | 1/1988 |
|---|---|---|
| DE | 43 29 172 | 3/1995 |
| EP | 0 512 704 | 11/1992 |
| EP | 0 736 993 | 10/1996 |
| WO | EP 0 453 831 | 10/1991 |
| WO | WO 97/16916 | 5/1997 |

OTHER PUBLICATIONS

"Produktschrift: System HICOM 600", Siemens AG, Product manual, Munich, Germany, 1984, No. A19100–K3161–G430–01, p. 39.

* cited by examiner

Primary Examiner—George Eng
(74) Attorney, Agent, or Firm—Shaw Pittman LLP

(57) ABSTRACT

Subscriber identity is determined when the public exchange has no information regarding the identity of the subscriber. When a subscriber accesses a telephone function of a system coupled to the public exchange, the system develops a relationship between a component of the system allocated to the subscriber and the identity of the subscriber. The identity is then forwarded to the public exchange. In a mail message system, the subscriber accesses his or her mail, and the system determines from the account, a relationship between an identity and a caller. The identity of the subscriber may be employed to activate a monitoring system. In another aspect, the identity of the subscriber may be employed for a point of service provider to the Internet.

18 Claims, 1 Drawing Sheet

US 6,839,409 B1

METHOD FOR HANDLING TELECOMMUNICATIONS CONNECTIONS VIA A PUBLIC EXCHANGE

BACKGROUND OF THE INVENTION

The present invention is directed to a method for handling telecommunications connections via a public exchange having terminal devices that are used by a number of telecommunications subscribers, whereby the allocation of a telecommunications subscriber to such a telecommunications connection ensues in the terminal devices.

In such a situation, the switching network mainly serves as a transport medium and has no information about the subscribers that the connections running over it are related to and what functions are handled in this context.

An example of such a constellation is the connection of a mailbox system, which—as seen from the point of view of the exchange—is a terminal device that can be reached under a specific telephone number but that is available to a number of subscribers. When a telephone subscriber wishes to query the content of his individual mailbox memory, then he must set up a telephone connection to the mailbox system via the public exchange and is then prompted, for example, to send an identification code to the mailbox system via the existing voice connection, this giving him access to his voice memory part thereat. Low information about the voice memory part that is being queried is present in the exchange in this context.

In this, as in comparable cases, functions implemented in the public exchange can not be applied to telephone subscribers that share a terminal device. One example of such a function is the possibility of monitoring telephone connections that, for example, is required by the German communications law and that also relates to voice or fax mailboxes.

Up to now, one therefore had to proceed such that the function relating to the possibility of monitoring was additionally implemented in the terminal device for terminal devices like the mailbox system or, such terminal devices were expanded by additional connection possibilities.

European Patent Application No. 0,512,704 discloses a system and a method for recognizing the point of origin of emergency calls in an emergency call system. What is thereby particularly involved is the identification of one of several stations of a private network from which an emergency call is supplied into a public network. In the proposed system, means are provided for a protocol transformation of the protocol of the private network into a protocol that can be interpreted by the emergency call network, and means are provided for allocating a telephone number to the station initiating the emergency call, and, finally, means are provided for the transmission of this number to central response location of the emergency call system. The solution is expressly tailored to a specific emergency call system and therefore relates only to very specific connections of the private network to the public network. For realizing the specific functions, specific components that are not allocated to the general telecommunication network are also provided in the emergency call system, for instance what is referred to as a station translation system (STS) module, a central organization (CO), and a switching tandem. The data traffic on the part of the private network required for the terminal station identification sequences with these specific components of the emergency call system and is only activated in the case of an emergency call.

SUMMARY OF THE INVENTION

It is an object of the invention is comprised in enabling the application of functions integrated in exchanges onto terminal equipment of the species initially cited in a simpler way.

This object is achieved in accordance with the present invention in a method for handling telecommunications connections via a public exchange having a number of terminal devices that are used by a number of telecommunications subscribers, whereby an allocation of a telecommunications subscriber to such a telecommunications connection ensues in said terminal devices, said method comprising the steps of: transmitting an information identifying a telecommunications subscriber to whom a connection relates to said public exchange from a terminal device no later than at an end of each and every connection set up.

An information identifying the telephone subscriber to whom the connection relates is transmitted to the exchange, accordingly, no later than following the end of each and every connection set up to a terminal device that can be utilized by a number of telecommunications subscribers, being transmitted from the terminal device to the exchange. Dependent on whether these information are required for handling a function related to a telecommunications subscriber, these information are then used for said purpose or are discarded otherwise. When implementing a monitor of telecommunications subscribers proceeding from the public exchange, this, due to the inventive method, would also be possible relating to a telephone subscriber who queries his mailbox memory proceeding from an arbitrary telephone device that need not be his terminal under which he is registered. In an embodiment thus, the inventive method is applied to a terminal device like the aforementioned mailbox system and the personal identification number is transmitted as an information identifying the telecommunications subscriber, being transmitted to the public exchange, this having been supplied from the querying subscriber to the mailbox system during the course of an established telephone connection to the mailbox system, for example in the form of a multi-frequency code combination in order to obtain access to the individual voice memory thereat.

In an embodiment, the terminal device to which the inventive method is applied is the network transition point of a service vendor to the Internet, and the information transmitted to the public exchange is the terminal device number of a called telecommunications subscriber to whom a telecommunications connection is set up via the Internet.

In an embodiment, the inventive method is applied to a terminal device in the form of an extension with direct dial connections, whereby the telephone numbers of the private branch exchange terminal device are transmitted to the public exchange.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1:
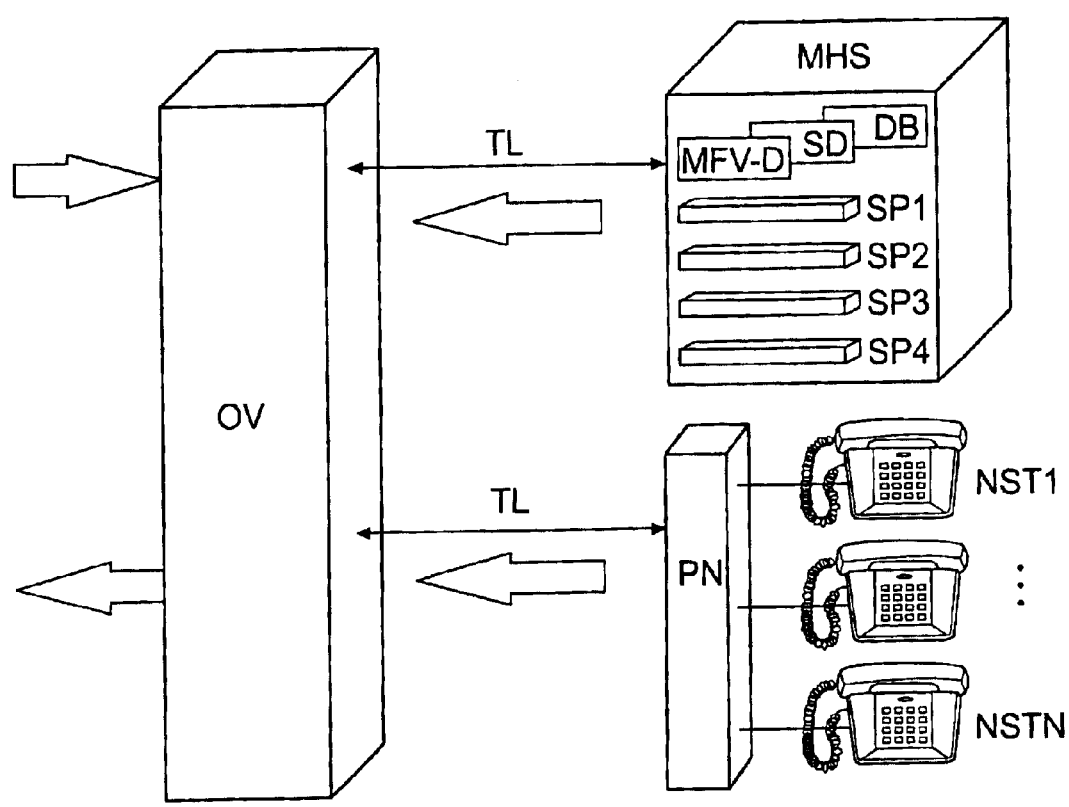
FIG. 1 is a block diagram of a public exchange and terminal devices.

In the FIG. 1 OV indicates a public exchange via which telecommunications traffic is handled in a standard way, this being indicated by broad arrows at the left-hand side.

In addition to other terminal devices (which are not shown here), terminal device that are used by a number of telecommunications subscribers are connected to this public exchange via subscriber lines TL. As an example, a mailbox system MHS as well as a private branch exchange PN capable of direct dialing are shown here.

The connection of these terminal devices ensues via an interface that offers a signaling channel, for example an interface working according to the ISDN protocol DSS1.

Voice memory sections SP1 through SP4 that are individually allocated to specific subscribers are shown as component parts of the mailbox system MHS. Further, a multi-frequency code character decoder MFV-D, a voice decoder SD and a data base DB are indicated.

The data base of the public exchange OV normally does not contain any particulars about the subscribers to whom a voice memory part is allocated in the mailbox system MHS or, about the subscriber terminal equipment NST1 through NSTN of the private branch exchange PN. This is superfluous because the decision to which of the number of subscribers of the terminal device a connection is to be set up is made within the terminal device. As already indicated, the query of a voice memory part of the mailbox system ensues by a telephone subscriber to whom this is allocated in that a telephone connection to this terminal device is set up by dialing the telephone number of the terminal device "voice memory system", and, potentially in response to a prompt, a personal identification number is input via the voice channel by key actuation at the calling telephone terminal equipment. After this has been decoded by the decoder MFV-D and by comparison to the entries in the data base DB, the mailbox system MHS can then produce a relationship of the established connection to the pertaining voice memory part.

When the function of a monitoring of specific call connections is implemented in the public exchange OV, a monitoring of those connections leading to a mailbox system cannot be implemented without further ado given the previous relationships, as presented.

Given all such terminal devices that are available to a number of telecommunications subscribers or, whose subscriber-associated devices are available, it is inventively provided that an information identifying a telecommunications subscriber belonging to the terminal device to whom the connection applies is sent to the exchange in conjunction with every connection set up, namely no later than after the end thereof. In the case of the described mailbox system MHS, when the personal identification number has been recognized by this or after the telecommunications subscriber seeking access has been recognized by decoding the personal identification number, an information identifying this subscriber is thus transmitted therefrom to the public exchange OV via the signaling channel of the interface DSS1.

The exchange could then compare this information to entries in a table wherein those telecommunications subscribers whose telecommunications connections are to be monitored are identified. When such an entry is found, the procedures serving the purpose of monitoring can then be activated. When such an entry is not present, then the information transmitted proceeding from the mailbox system is discarded.

Similar events sequence in conjunction with the terminal device "extension with direct dialing", whereby data that indicate the private branch exchange terminal device numbers are transmitted in the data channel of the interface DSS1 as information identifying the subscribers. Here, too, the information transmitted to the public exchange OV can be utilized in conjunction with call monitoring of specific private branch exchange subscribers. Another possibility of employment would be comprised in producing individual call tickets for private branch exchange connections.

Another type of terminal device that is available to a number of telecommunications subscribers and that is not shown here would be, as indicated, points of presence (PoP) of Internet providers that lead to the Internet. In this context, too, the monitoring of telephone connections to telecommunications subscribers that, given the collaboration of the Internet provider, are brought about without further involvement of the public exchange, apart from setting up a connection to the terminal device PoP, would come into consideration.

In this case, the information transmitted to the public exchange would be the terminal device number of a called subscriber to whom a telecommunications connection is set up via the Internet.

Although modifications and changes may be suggested by those of ordinary skill in the art, it is the intention of the inventors to embody within the patent warranted hereon all changes and modifications as reasonably and properly come within the scope of their contribution to the art.

We claim:

1. A system for handling telecommunications, comprising:
   a public exchange through which telecommunications traffic is handled in a standard manner, wherein the public exchange does not contain identification information regarding the subscribers;
   terminal equipment utilized by a plurality of telecommunications subscribers connected to the public exchange;
   a telephone function system coupled to the public exchange for providing a telephone function, including components allocated to specific subscribers; and
   a table coupled to the public exchange for identifying subscribers that are to be monitored as required by communications law,
   wherein, when a particular subscriber queries the telephone function system to activate the telephone function, the terminal equipment requests to access an allocated component to the system in order to engage the telephone function of the telephone function system,
   wherein, in response to querying the allocated component, the telephone function system produces a relationship between the allocated component and an identity of the particular subscriber based on subscriber information stored in the telephone function system, and
   wherein the identity of the particular subscriber is forwarded to the public exchange, and the public exchange uses the table to determine whether the particular subscriber is to be monitored.

2. The system of claim 1, wherein the telephone function system is a mailbox system and the components are memory sections comprising voice data and information allocated to individual subscribers.

3. The system of claim 2, wherein the terminal equipment sends a multi-frequency code as the information identifying the allocated component.

4. The system of claim 1, wherein the telephone function system further comprises a decoder for decoding the information identifying the allocated component sent from the terminal equipment.

5. The system of claim 1, wherein the telephone function system compares the query to entries in a data base regarding the particular subscriber.

6. The system of claim 1, wherein the terminal equipment is comprised of a plurality of terminal equipment items, each of which is associated with a respective terminal equipment number, and wherein the telephone function system determines and sends private branch exchange terminal equipment numbers to the public exchange based on the relationship.

7. The system of claim 6, wherein the public exchange produces call tickets for private branch exchanges based on the private branch exchange terminal equipment numbers.

8. The system of claim 1, wherein the terminal equipment comprises a point of presence of Internet providers.

9. The system of claim 8, wherein the telephone function system sends to the public exchange a terminal device number of a called telecommunication subscriber to whom a telecommunications connection is set up via the Internet.

10. A method for handling telecommunications in a network including a public exchange through which telecommunications traffic is handled in a standard manner, terminal equipment utilized by a plurality of telecommunications subscribers connected to the public exchange, wherein the public exchange does not contain identification information regarding the subscribers, a telephone function system coupled to the public exchange for providing a telephone function, including components allocated to specific subscribers, and a table coupled to the public exchange for identifying subscribers that are to be monitored, the method comprising the steps of:

the terminal accessing the allocated component of the telephone function system in response to a particular subscriber querying the telephone function system to activate the telephone function of the terminal equipment;

in response to the information identifying the allocated component, the telephone function system producing a relationship between the identified component and an identity of the particular subscriber based on subscriber information stored in the telephone function system as required by communications law; and forwarding the identity of the particular subscriber to the public exchange, wherein the public exchange determines whether the particular subscriber is to be monitored according to information in the table.

11. The method of claim 10, wherein the telephone function system is a mailbox system, further comprising the step of the particular subscriber querying the mailbox system and, in response thereto, the mailbox system determining the identity of the particular subscriber from memory sections comprising voice data and information allocated to individual subscribers.

12. The method of claim 11, further comprising the step of the terminal equipment sending a multi-frequency code as the information identifying the allocated component.

13. The method of claim 10, further comprising the step of decoding the information identifying the allocated component sent from the terminal equipment.

14. The method of claim 10, further comprising the step of comparing the query to entries in a database regarding the particular subscriber.

15. The method of claim 10, further comprising the step of the telephone function system determining and sending private branch exchange terminal equipment numbers to the public exchange based on the relationship, wherein the terminal equipment is comprised of a plurality of terminal equipment items, each of which is associated with a respective terminal equipment number.

16. The method of claim 15, further comprising the step of the public exchange producing call tickets for private branch exchanges based on the private branch exchange terminal equipment numbers.

17. The method of claim 10, further comprising the step of the terminal equipment providing a point of presence of Internet providers.

18. The method of claim 17, further comprising the step of the telephone function system sending to the public exchange a terminal device number of a called telecommunications subscriber to whom a telecommunications connection is set up via the Internet.

* * * * *